(12) United States Patent
Wei

(10) Patent No.: US 12,044,780 B2
(45) Date of Patent: Jul. 23, 2024

(54) MULTIPLE LINEAR SENSORS IN SENSING SYSTEMS FOR ROBOTIC APPLICATIONS

(71) Applicant: CMOS Sensor, Inc., Cupertino, CA (US)

(72) Inventor: Hui Wei, San Jose, CA (US)

(73) Assignee: CMOS Sensor, Inc., San Jose, CA (US)

(*) Notice: Subject to any disclaimer, the term of this patent is extended or adjusted under 35 U.S.C. 154(b) by 423 days.

(21) Appl. No.: 17/126,037

(22) Filed: Dec. 18, 2020

(65) Prior Publication Data

US 2022/0276385 A1 Sep. 1, 2022

Related U.S. Application Data

(63) Continuation-in-part of application No. 15/981,926, filed on May 17, 2018, now Pat. No. 11,067,673.

(51) Int. Cl.
| | |
|---|---|
| *G01S 17/894* | (2020.01) |
| *G01S 7/484* | (2006.01) |
| *G01S 7/4863* | (2020.01) |
| *G01S 17/93* | (2020.01) |

(52) U.S. Cl.
CPC ............ *G01S 17/894* (2020.01); *G01S 7/484* (2013.01); *G01S 7/4863* (2013.01); *G01S 17/93* (2013.01)

(58) Field of Classification Search
None
See application file for complete search history.

(56) References Cited

U.S. PATENT DOCUMENTS

2018/0149753 A1* 5/2018 Shin ................. G01S 7/4811

OTHER PUBLICATIONS

J. -A. Beraldin et al., "Optimized position sensors for flying-spot active triangulation systems," Fourth International Conference on 3-D Digital Imaging and Modeling, 2003. 3DIM 2003. Proceedings., Banff, AB, Canada, 2003, pp. 28-36, doi: 10.1109/IM.2003.1240229. (Year: 2003).*

* cited by examiner

*Primary Examiner* — Luke D Ratcliffe
(74) *Attorney, Agent, or Firm* — Joe Zheng

(57) ABSTRACT

A sensing system is designed to include a plurality of linear sensors, where these linear sensors are spaced apart, positioned or disposed in parallel on a substrate. These sensors are provided to detect respective distances towards a target from different planes so as to generate a plurality of 2D maps. A thin or coarse 3D map is then generated from these 2D maps to facilitate movements of a mobile robot employing the sensing system.

19 Claims, 17 Drawing Sheets

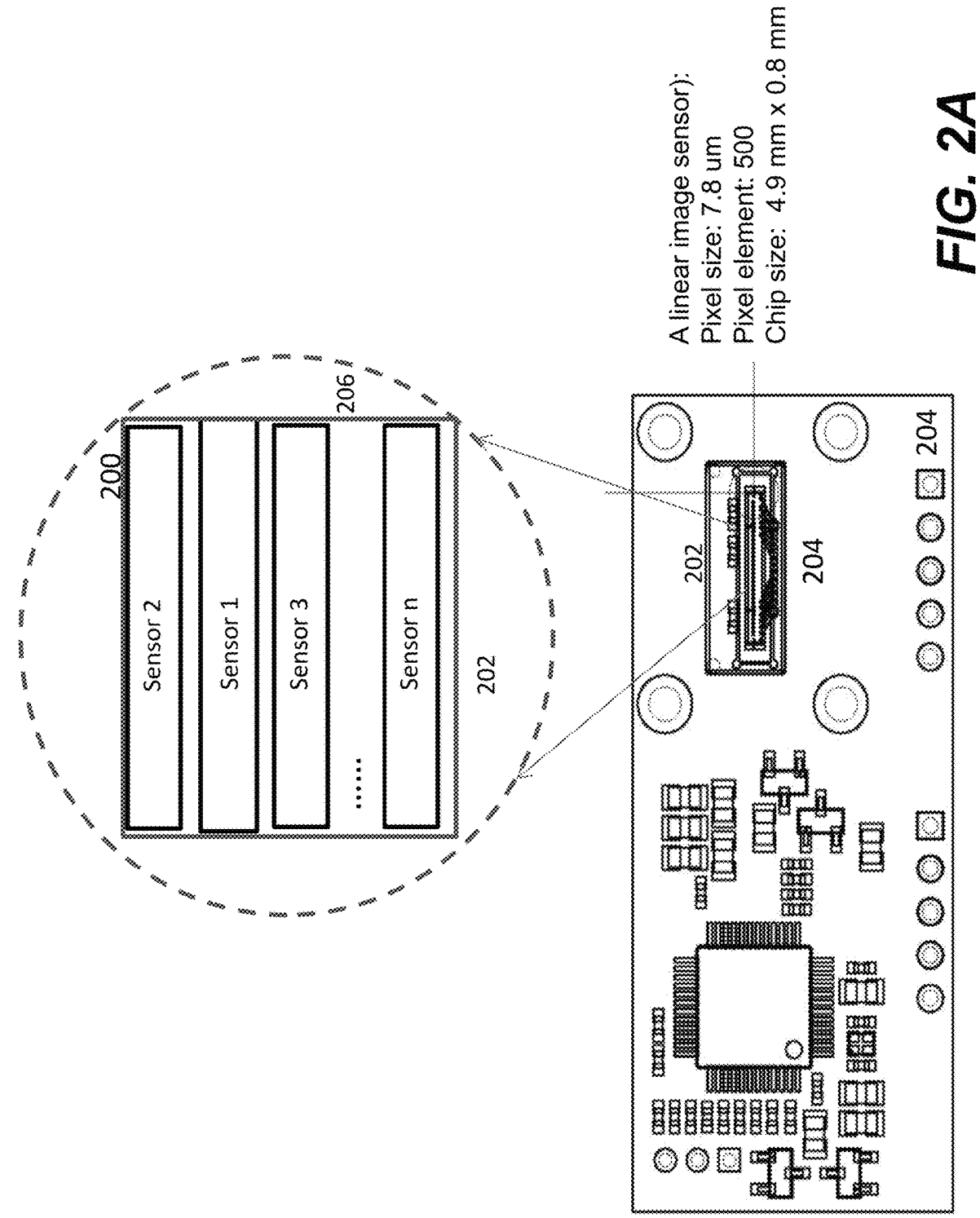

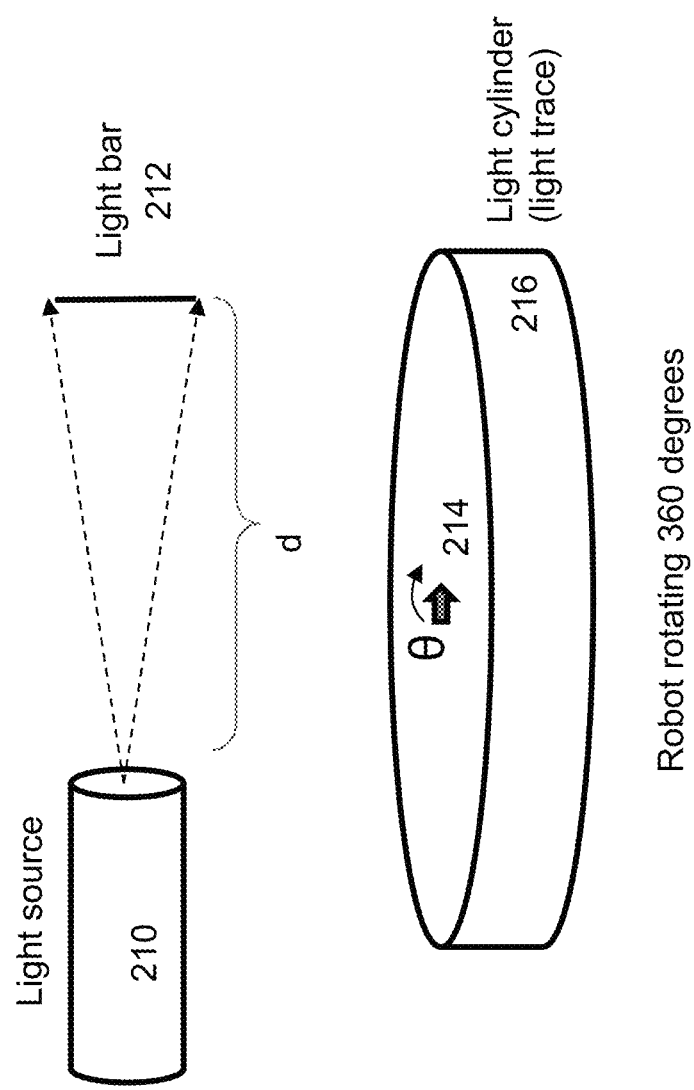

In 2D Map, distance data set is generated in a pair of (B, d)

In 3D Map, instead of a (B, d), the d needs to separated into (d1, d2), the distance data set is denoted as (B, d1, d2)

$Tan(A) = Z/f$
$d1 = d * cos(A)$
$d2 = d * sin(A)$

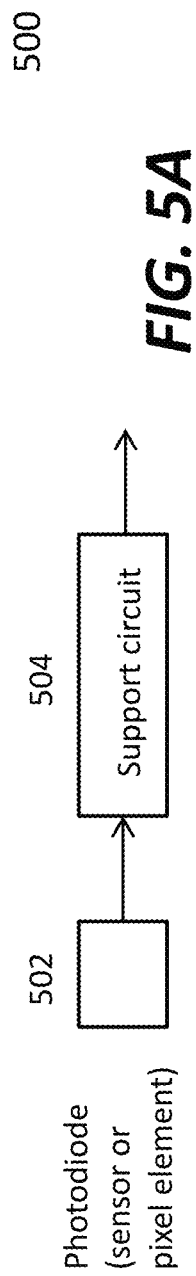
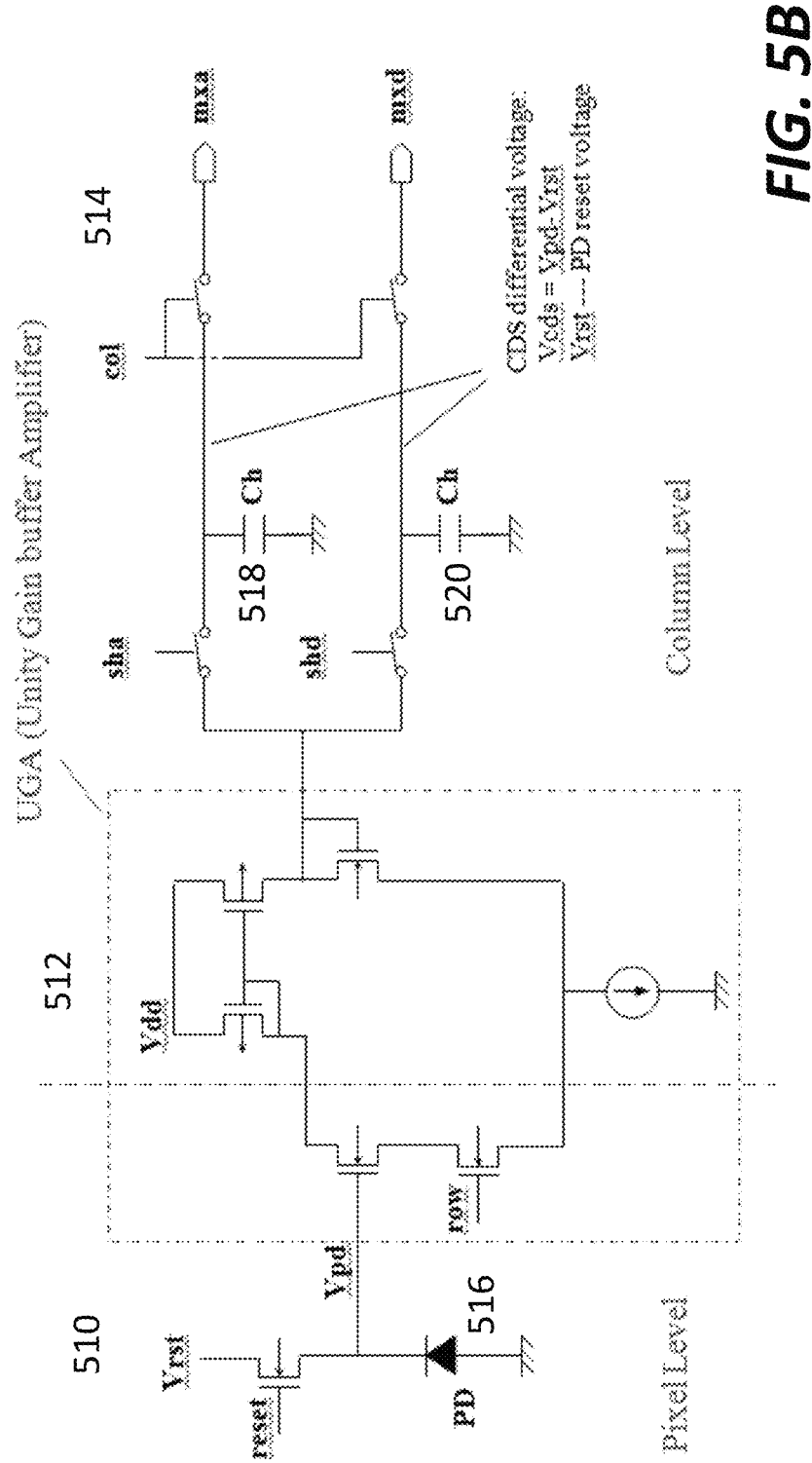
FIG. 5A
FIG. 5B

- Save Exp1 with IR emit, stopping the sensor clock at the critical timing to create Exp 2 in sensor.

MULTIPLE LINEAR SENSORS IN SENSING SYSTEMS FOR ROBOTIC APPLICATIONS

CROSS-REFERENCE TO RELATED APPLICATIONS

This application is a continuation-in-part of co-pending U.S. patent application Ser. No. 15/981,926, entitled "Sensor, apparatus for lidar application and method of background cancellation", filed on May 17, 2018.

BACKGROUND OF THE INVENTION

1. Field of the Invention

The present invention is related to the area of robotic vision systems. More particularly, the present invention is related to a sensing system including at least two linear sensors provided to sense surrounding of a robot to generate a 3D model of a scene and method of using the same.

2. Description of Related Art

Mobile robotics is one of the fastest expanding fields of scientific research nowadays. With proper additional mechanisms, mobile robots can substitute humans in many applications, such as surveillance, patrolling, industrial automation, and construction. A robot is autonomous when the robot itself has the ability to determine the actions to be taken to perform a task, using a perception system that helps it. Lidar (also called LIDAR, LiDAR, or LIDAR) is a common solution in many applications such as robotic vacuuming. It is a surveying method that measures distance to a target by illuminating the target with dot pulsed laser light and measuring the reflected pulses with a sensor. Differences in locations (or response) of the dot laser returns on the sensor are then be used to make digital 3-D representations of the target. The name lidar, now used as an acronym of light detection and ranging (sometimes light imaging, detection, and ranging), was originally a portmanteau of light and radar. Lidar sometimes is also called laser scanning and laser depth sensor scanning with terrestrial, airborne, and mobile applications.

Lidar uses ultraviolet, invisible, or near infrared light to image objects. It can target a wide range of materials. FIG. 1A illustrates a configuration 100 of using a laser and an imager to detect a distance d between the laser and an object being projected with a laser, all based on triangulation. In operation, an activated dot laser 102 is provided to light the object 104. A sensor 106 is provided to detect the lighted dot or reflection on the object. Based on the preconfigured geometry of the laser 102 and the imager 106, the distance q can be derived based on triangulation.

FIG. 1B shows an exemplary environment 110 in which there is a moving object or a robotic vacuum 112 moving around in the environment. The robot 112 is equipped with a lidar. The lidar is mounted on the robot 112 and rotates 360 degree in high speed. For the floor mapping applications, the imager used in the lidar is a liner sensor. Thus the lidar can get 2D SLAM (Simultaneous Localization and Mapping) information of the surroundings. FIG. 1C shows a corresponding map of the lidar to indicate a profile of the surrounding. FIG. 1D shows a plane 114 on which the 2D SLAM information can be obtained. However, there is one obvious problem that comes with the configuration 100 or 110. The lidar can very well miss an object below a certain height (referring to as a blind height herein, e.g., 2 inches). A low profile object (e.g., excrement of house pet) on the floor would not be detected and could cause a big mess if the robot 112 runs over it. There is thus a need for a solution for sensing all objects in an environment regardless how their profiles may be. Although a full 3D imaging may be desirable, such robots may become practically expensive and complicated if a real 3D imaging system is provided. Thus there is another need for a simple solution capable of sensing low-profiled objects without full 3D imaging.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of image sensors and its practical uses. According to one aspect of the present invention, a sensing system is designed to include a plurality of linear sensors, where these linear sensors are spaced apart, positioned or disposed in parallel on a substrate. Each of the sensors is provided to detect a distance towards an object from a different plane. A thin or coarse 3D map is generated from 2D maps from these linear sensors.

According to one aspect of the present invention, a light (e.g., laser) source projects a light bar that can be used to shine a range of height. Respective rays reflected from different heights are captured by the sensors, sensing signals from these sensors are respectively analyzed to generate the 2D maps, from which the 3D map is then derived.

According to another aspect of the present invention, each of the sensing signals from the sensors is processed in a processor or multiplexed to be processed in a processor.

To ensure that the linear sensors generate valid 2D maps, these linear sensors take advantage of the architecture of CMOS sensor with correlated double sampling, or CDS, to avoid the sensing speed being halved. It is commonly known that a photosensor is read twice (i.e., first and second readouts) in CDS for removing the inherent noises from the photosensor itself. Instead of subtracting a pixel's dark or reference output level from an actual light-induced signal, a background image is managed to be captured before the second readout of the sensor and subtracted from an actual image, where the actual image is assumed to include a target. As a result, the readout speed of an image sensor is maintained while the background light interference is removed.

According to still another aspect of the present invention, a 2D sensor is operated to work as multiple line sensors when the 2D sensor is used. Color filters may be added to allow the vertical sensors to generate color images. Depending on implementation, color filters may be based on a set of red, green and blue (RGB) filters or a set of RGB filters with other filter(s) (e.g., infrared or UV light).

According to yet another aspect of the present invention, there are two independent storage devices (e.g., capacitors) in the photosensor, each provided to store a charge from an exposure. According to yet another aspect of the present invention, a clock signal circuit is provided to control the first and second readouts of a photosensor sensor. Clock signals are designed to ensure two independent exposures take place successively within one image frame. The two readouts stored in the capacitors from the two independent successive exposures are available from which a final signal is obtained.

The present invention may be implemented in various ways including a method, an apparatus or a system. According to one embodiment, the present invention is a sensing system that comprises a substrate, a plurality of linear sensors spaced apart in parallel and deposed on the substrate, each of the linear sensors including a plurality of sense elements, and a light source projecting a light bar, wherein the light bar hits a target to produce a plurality of reflected beams. The reflected beams impinge upon the linear sensors respectively to generate a plurality of 2D maps. These 2D maps can be then be combined via a computation unit (e.g., a circuit or a processor) to generate a coarse 3D map of the target within a predefined height.

According to another embodiment, the present invention is a method for a sensing system to generate a coarse 3D map, the method comprising: projecting a light bar forward from a light source, wherein the light bar hits a target to produce a plurality of reflected beams, wherein the reflected beams impinges upon a plurality of linear sensors, generating a plurality of 2D maps respectively produced via the linear sensors spaced apart in parallel and deposed on the substrate, each of the linear sensors including a plurality of sense elements, and generating a coarse 3D map of the target from these 2D maps.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A shows a sensing system including a plurality of linear sensors, where these sensors are disposed in parallel on a substrate;

FIG. 2B shows a light source that projects a light bar used in a sensing system in one embodiment of the present invention;

FIG. 5A shows a functional block diagram of a single pixel in an image sensor;

FIG. 5B shows an exemplary design of a sensor or pixel element with an optional amplifier and a readout circuit, where the pixel element further includes a photodiode that is controlled to be turned on or off;

DETAILED DESCRIPTION OF THE INVENTION

Figure 1B:
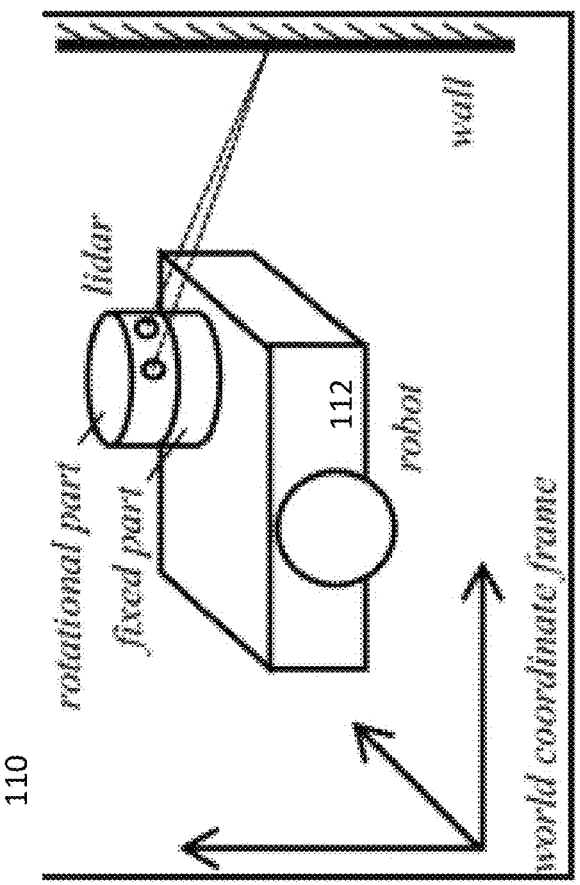
FIG. 1B shows an exemplary environment in which there is a robot moving around in the environment.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Embodiments of the invention are discussed below with reference to FIGS. 2A-8. However, those skilled in the art will readily appreciate that the detailed description given herein with respect to these figures is for explanatory purposes as the invention extends beyond these limited embodiments.

An active-pixel sensor (APS) is an image sensor includes an integrated circuit containing an array of pixel sensors, each pixel containing a photodetector and an active amplifier. There are many types of active pixel sensors including the CMOS APS. Such an image sensor is produced by a CMOS process (and is hence also known as a CMOS sensor), and has emerged as an alternative to charge-coupled device (CCD) image sensors. Depending on an application, the image sensor may be implemented as a linear sensor or an area sensor. To facilitate the description of the present invention, the description herein is largely based on a linear array of photosensors unless explicitly stated.

FIG. 2A shows a sensing system 200 including a plurality of linear sensors 202, where all of the linear sensors 202 are deposed in parallel, preferably fixed on a substrate, for example, a printed circuit board (PCB) and thin film. In one embodiment, there are at least two linear sensors deposed in parallel, hence a first sensor and a second sensor. In one embodiment, both of these sensors are linear sensors and operate simultaneously or in different periods. Each of these sensors is primarily responsible for sensing a distance between a light source and an object being shined. According to another embodiment, an area sensor is used and operated as a plurality of linear sensors. These linear sensors shall have a significant distance or gap therebetween to reduce the amount data the area sensor outputs. In operation, only a few defined rows or columns of sensor elements on the area sensor are addressed and signals thereon are read out.

FIG. 2A also shows an exemplary printed circuit board (PCB) 204 on which there is a substrate 206 provided to support the sensors 202 to define a rigid relationship therebetween and also define a relationship to a light source. Depending on implementation, the light source includes a laser diode with a lens system. FIG. 2B shows a light source 210 that projects a light bar 212. Different from a laser dot commonly used in a lidar or a system for measuring a distance, the light source 210 projects a light line or bar 212. Depending on the distance d, the length of the light bar varies. As a sensing system 214 (e.g., 200 of FIG. 2A) rotates rapidly, tracing the light bar 212 appears a light cylinder, where the sensing system 214 senses a band of circle. As used herein, a rotation angle of the sensing system 214 is denoted as B.

Figure 2C:
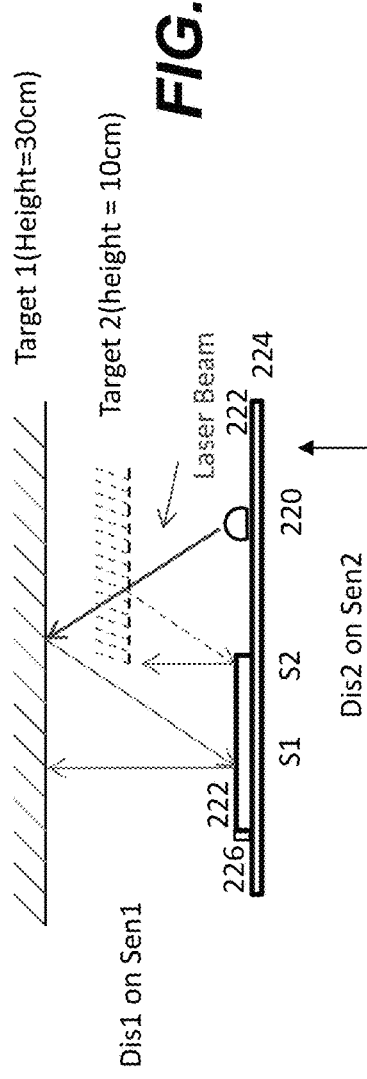
FIG. 2C shows that a laser diode projects a beam bar that hits two targets, causing two reflected beams to impinge upon two respective sensors positioned in parallel.

FIG. 2C shows that a laser diode 220 projects a light bar or beam that hits target 1, the reflected beam impinges upon a first sensor 222 at location S1. Both of the laser diode 220 and the sensor 222 are mounted on a substrate 224 and maintain a predefined distance therebetween. The location S1 of the reflected beam on the sensor 222 dictates the distance between target 1 and the substrate 224. As the beam is a light bar, another portion of the beam hits target 2. The reflected beam impinges upon a second sensor 226 at location S2. The location S2 of the reflected beam on the sensor 212 dictates the distance between target 2 and the substrate 214.

Figure 2D:
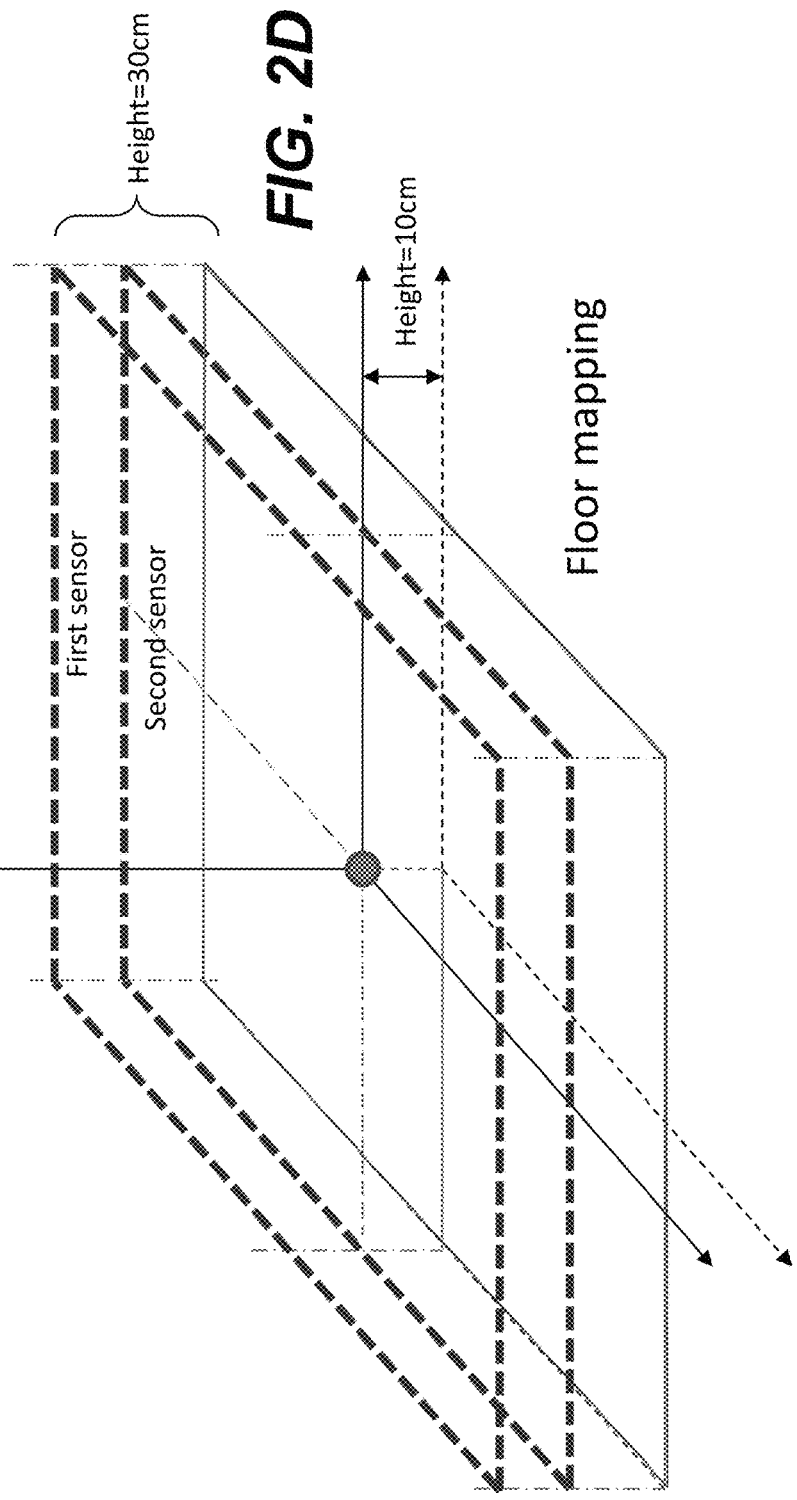
FIG. 2D shows an exemplary geometry of two sensing areas being imaged by two respective sensors positioned in parallel.

FIG. 2D shows an exemplary geometry of two areas corresponding to FIG. 2C. It is assumed that there are only two sensors 222 and 226. Accordingly, there are two planes shown in FIG. 2D, each representing where two sensors 222 are looking at. It can be appreciated that there can be more viewing planes when there are more sensors. As the sensing system 214 of FIG. 2B rotates, targets around the sensing system 214 can be detected, namely a distance towards a surface of a target can be measured.

Figure 3A:
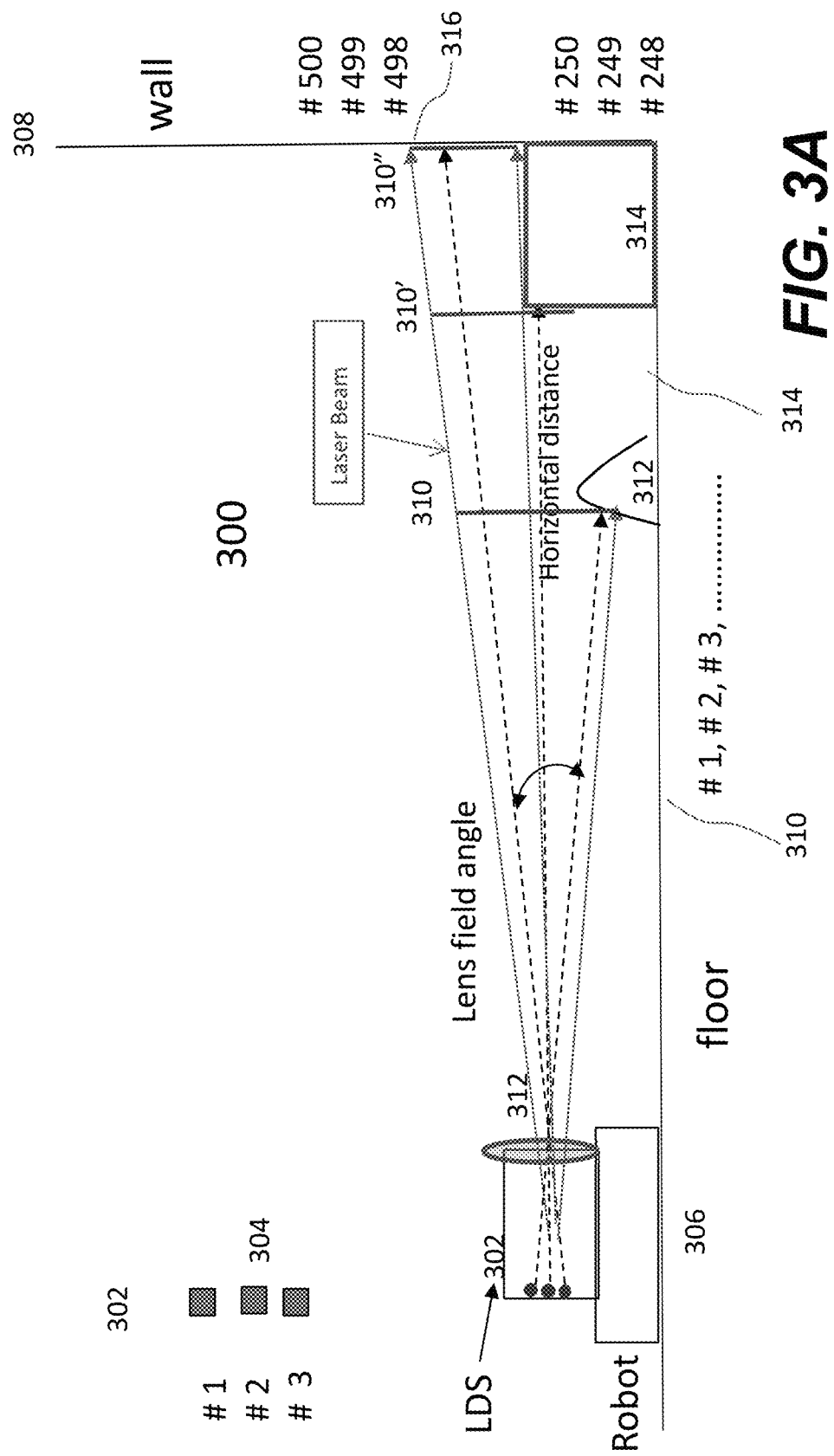
FIG. 3A illustrates an exemplary configuration in which a light bar projects onto three objects with different heights.

Referring now to FIG. 3A, it illustrates a configuration 300 in which a sensing system including a plurality of linear sensors 302. For simplicity, three of the linear sensors 302 are shown in FIG. 3A. As described above, one of the three sensors, for example, the middle one 304 is part of a lidar system that detects a distance horizontally between the robot 306 and a target 308. As shown in FIG. 2D, the horizontal distance is measured at a height (e.g., 10 cm or roughly 4 inches). Should there be something on the floor or shorter than 10 cm, it would not be detected by the sensor 304.

FIG. 3A shows that two other sensors above and below the sensor 304, each can sense an object at different heights.

According to one embodiment, a light source (not shown) projects a light bar 310 a first part of which shines or hits a first object 312 (e.g., a toy). A second part of the light bar then hits a second object 314 (e.g., furniture) and a third part of the light bar finally hits a third object 316 (e.g., a wall). Based on the triangulation or similar triangle theorems, the distance towards to each of the objects can be derived via different sensors. One of the advantages, benefits and objectives in the present invention is the ability of detecting a 3D profile of what is in front of a mobile robot. Compared to a full 3D profile that would require expensive components for extensive computations to generate overwhelming data sets, the thin or coarse 3D profile generated in one embodiment uses a few line sensors, a chip with multiple linear sensors or a 2D sensor (in which a few specified number of lines are addressed and read out) and requires far fewer components to generate just-enough data sets to guide a mobile robot to move around in an enclosed environment. Further this 3D profile is limited within a predefined height. For example, a clearance of a mobile robot is 6 inches, any data leading to calculations or a desired 3D profile of the target beyond 6 inches high would not be useful.

Figure 1A:
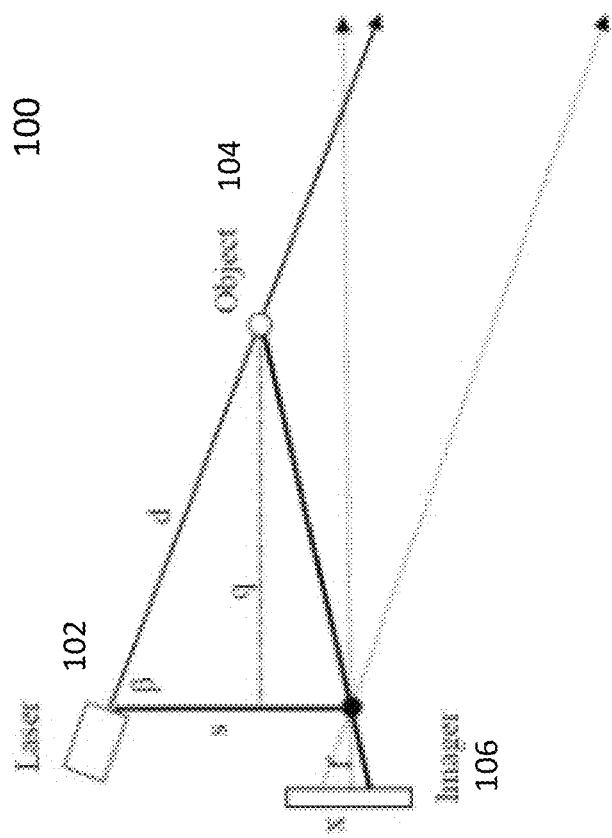
FIG. 1A illustrates a configuration of using a laser and an imager to detect a distance d between the laser and an object being impinged upon by the laser, all based on triangulation.
Figure 1C:
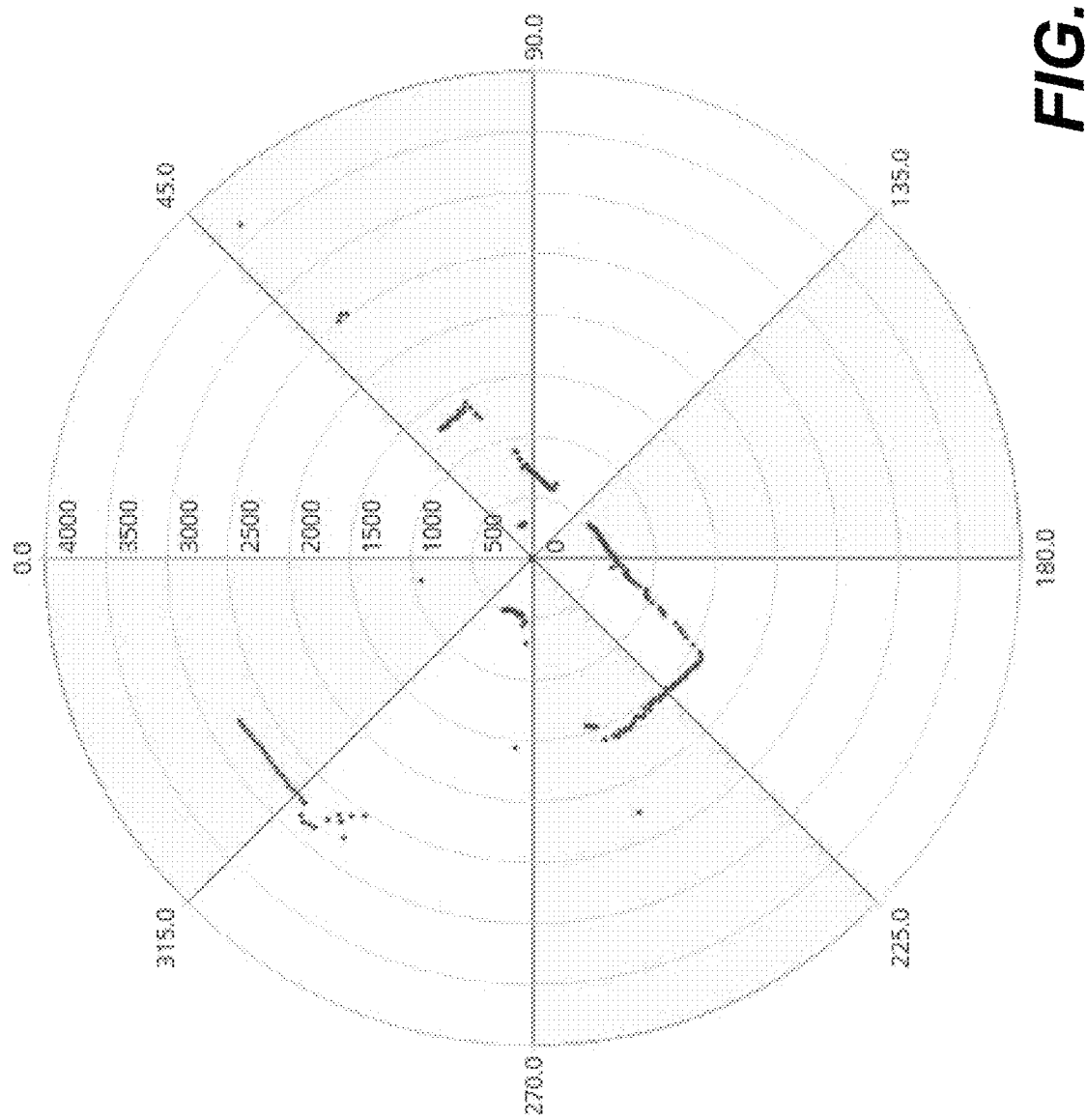
FIG. 1C shows a corresponding map from a lidar to indicate a profile of an exemplary surrounding.
Figure 1D:
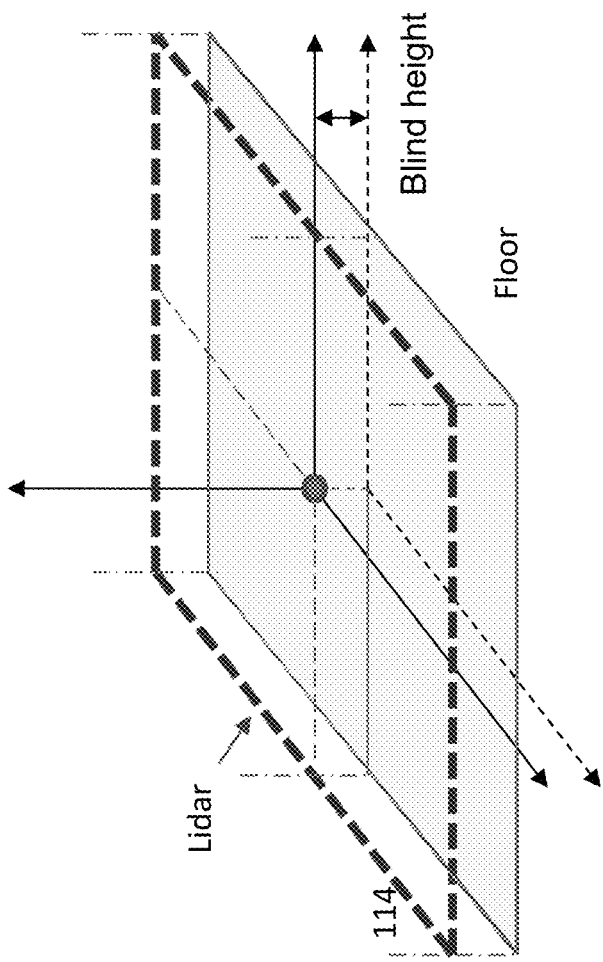
FIG. 1D shows a surface plane on which 2D information may be obtained from the lidar.
Figure 3B:
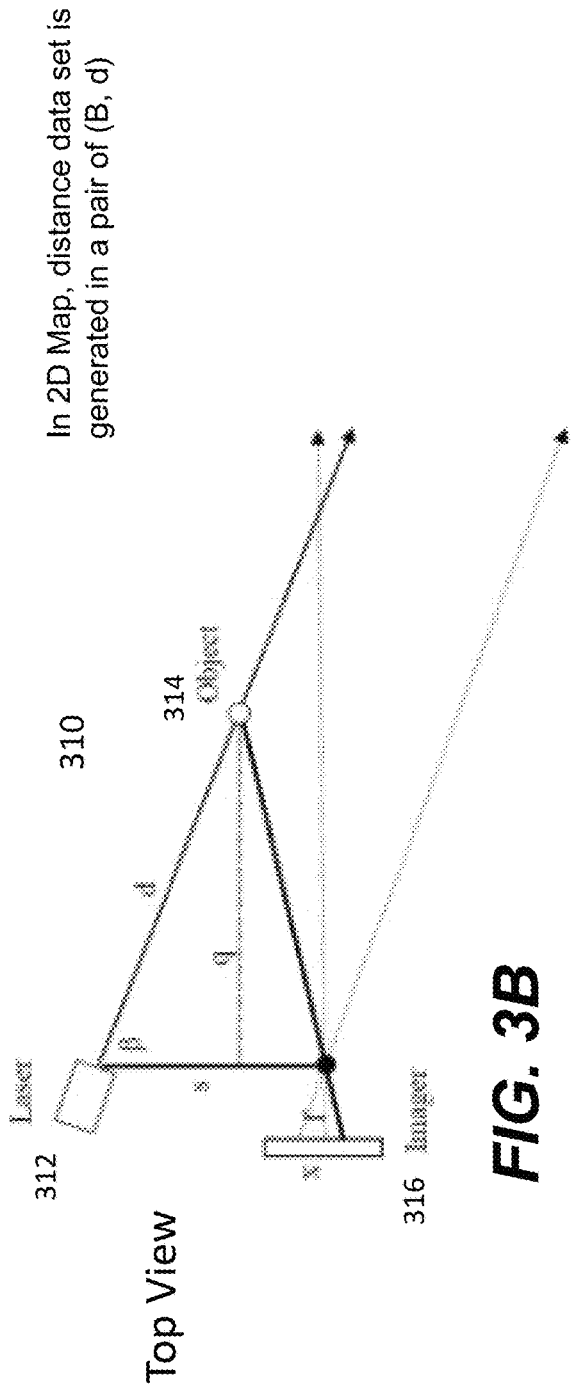
FIG. 3B duplicates FIG. 1A to show how a thin 3D map is evolved from a traditional lidar.

FIG. 1A is duplicated in FIG. 3B to show how a thin 3D map is generated or evolved from a traditional lidar. The configuration 310, a top view, in FIG. 3B is commonly used in detecting a distance on a plane at a predefined height. A light source 312 projects a light dot that hits an object 314. A reflected beam impinges upon an image sensor 316. Given the fact that the distance between two adjacent sensor elements (e.g., photosensors) on the sensor 316 is known together with the relationship between the light source 312 and the sensor 316 and the angle β, the distance q or d towards the object 314 is readily obtained.

Figure 3C:
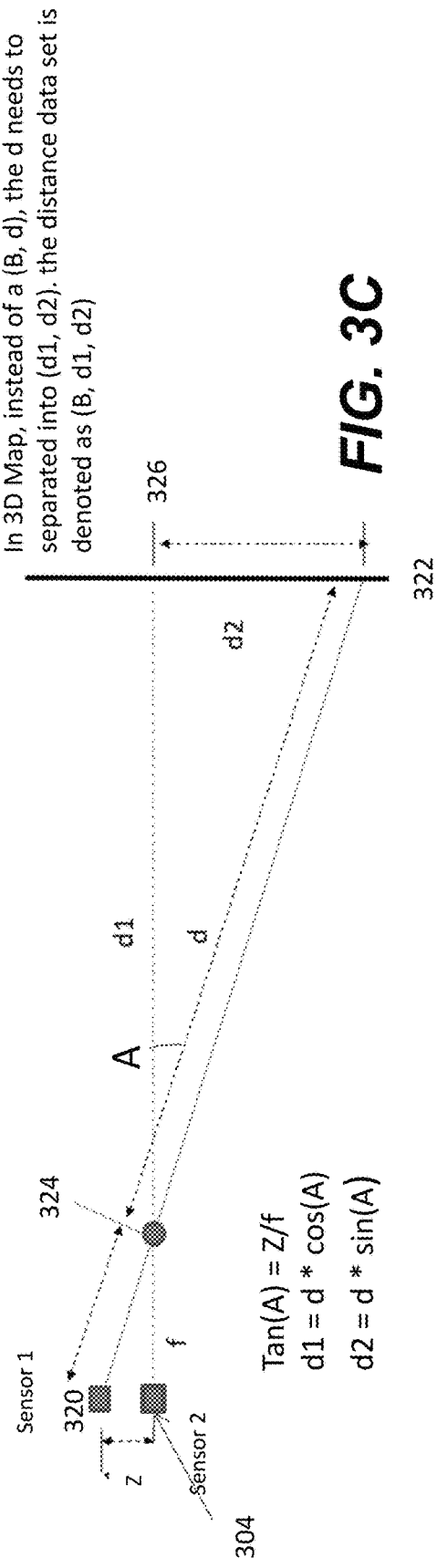
FIG. 3C shows a side view of a sensor above a middle sensor assumed in FIG. 3A.

It is assumed that FIG. 3B is a top view of the middle sensor 304. FIG. 3C shows a side view of a sensor 320 above the middle sensor 304 of FIG. 3A, where it is labeled as Sensor 1. When a portion of the light bar hits an object 322, the reflected beam (bounced off) from the object 322 impinges upon the sensor 320. The distance d can be derived by using triangulation shown in FIG. 3B. Given the focal length f and the gap distance Z between the sensor 320 and the middle sensor (i.e., sensor 304 of FIG. 3A), it is not difficult to derive the horizontal distance d1, and vertical distance d2 from the center plane in 2D or central point 326 to the object 322. It is understood to those skilled in the art a height d2 of the object 322 with respect to the plane 326 can be readily calculated. As a result, the output from the sensors other than the sensor 304 can be expressed as (B, d1, d2), where B is a rotation angle of the sensing system with respect to an axis (e.g., X or horizontal axis) and d1 is a distance towards the measured object. It can be appreciated that d1=d or d2=0 when the reading is from the middle sensor 304 (i.e., right on the center plane if viewed in 2D).

Figure 3D:
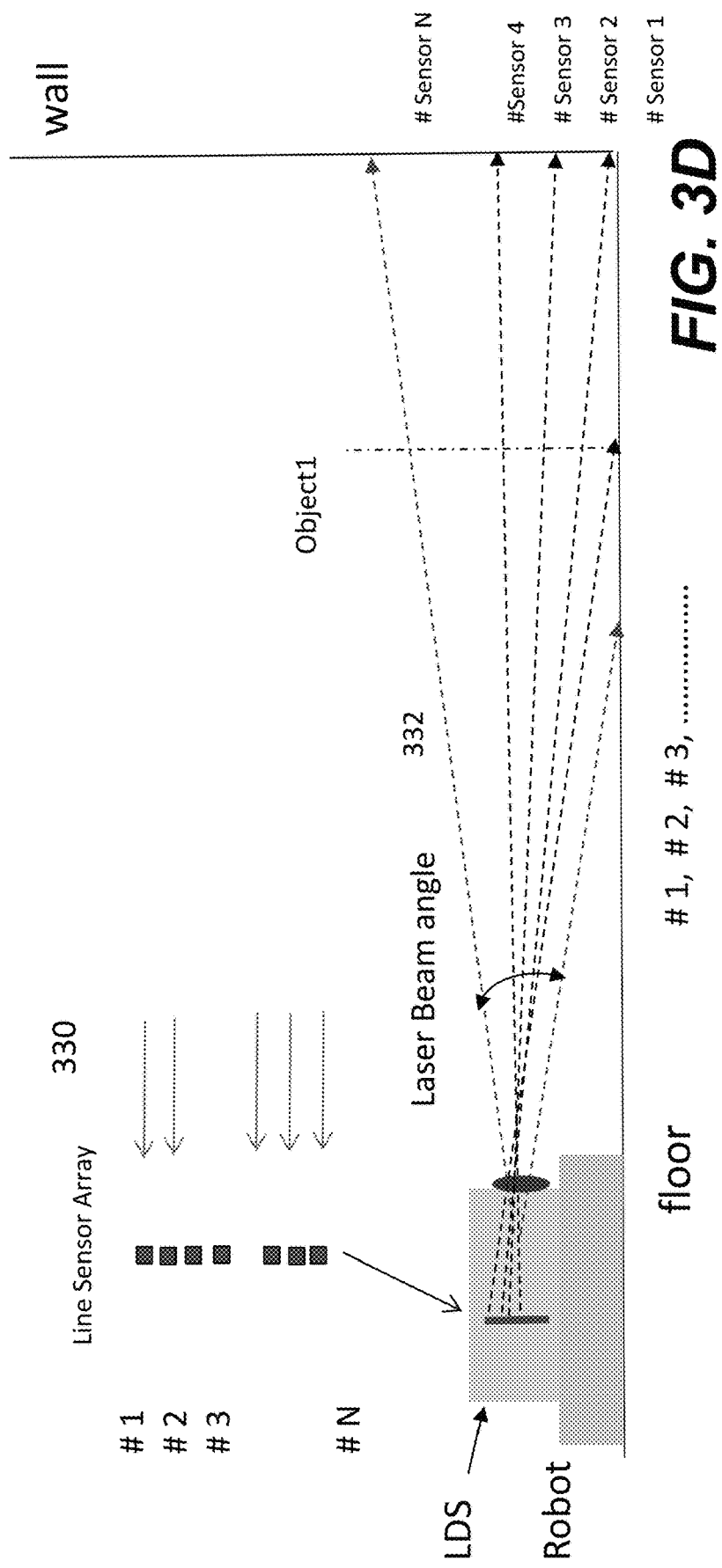
FIG. 3D shows a side view of a sensing system according to one embodiment of the present invention.

FIG. 3D shows a side view of a sensing system 330 according to one embodiment of the present invention. There are N sensors in the sensing system 330. A laser bar is projected outwards and may hit one or more objects. Because the laser bar is projected from a point, the rays of the laser spread as the go further, which in return allows these N sensors to see the rays or beams reflected from the one or more objects from different upward and downward views, therefore covering a circular range. Given the fact how the distances d1 and d2 are calculated in FIG. 3C, one of the N sensors is defined as a middle sensor that sees or defines a center plane (corresponding to a center place 326). In theory, any one of the N sensors can be defined as the center or middle sensor. But in general, a middle one in the sensor array (when N is an odd number) or a sensor close to the geometric center of the sensor array (when N is an even number) is used as the middle sensor.

Figure 4A:
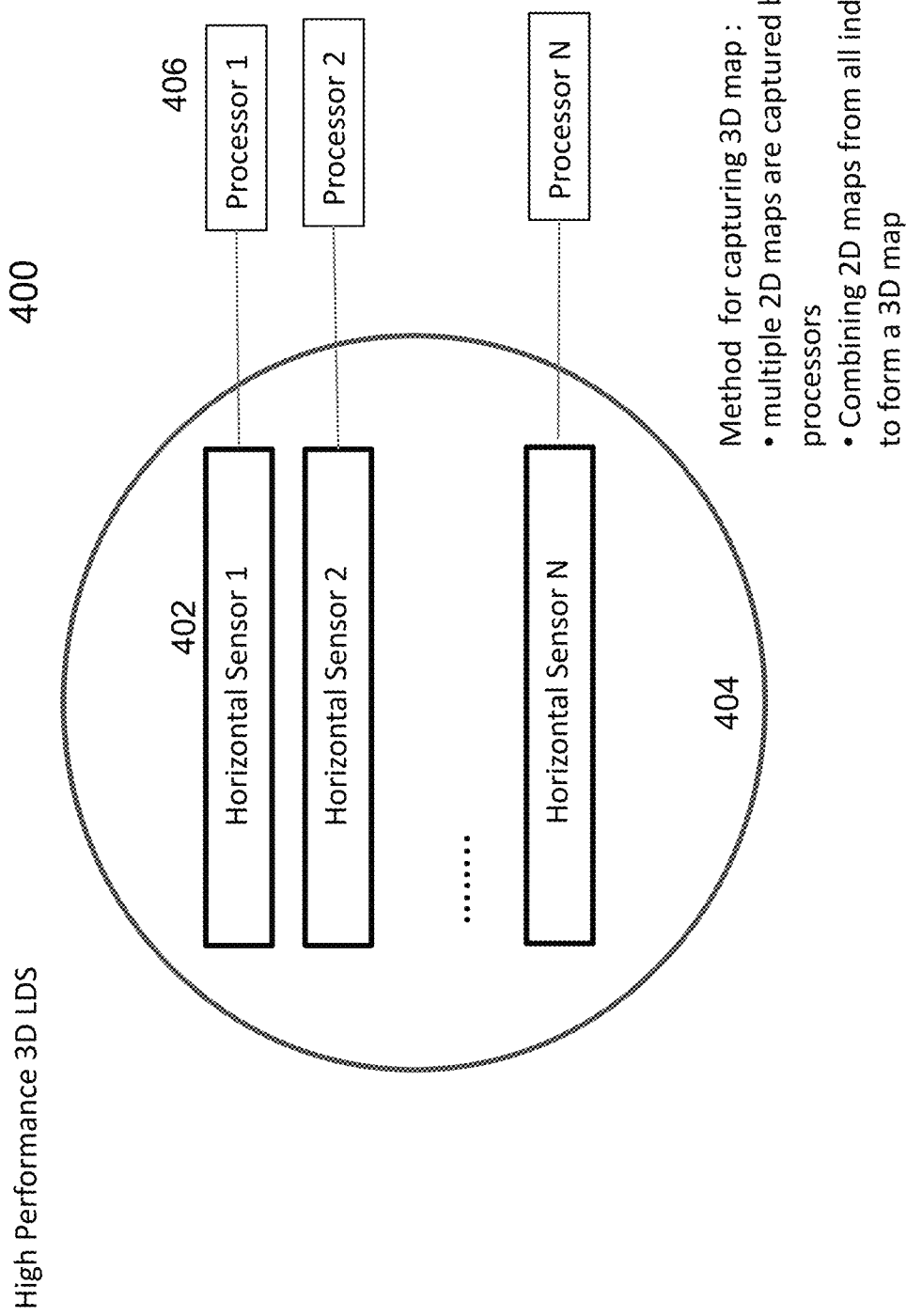
FIG. 4A shows an exemplary implementation of generating a (coarse) 3D profile or map of a target.

Referring now to FIG. 4A, it shows an exemplary implementation 400 of generating a (coarse) 3D profile or map of a target. There are N linear sensors 402 deposed in parallel on a substrate 404, where the sensors 402 are often equally spaced. The gap distance between any two of the sensors 402 is predefined and a known parameter that will be used to determine a distance when operating. Depending on implementation and application, N being an integer is preferably greater than 2. According to one embodiment, N processors 406 are employed, each of the processors 406 supports one of the sensors 402. In operation, a sensing signal from a sensor is coupled to a corresponding processor, which means parallel processing of all sensing signals from the sensors 402. The results (2D maps) from the processors 406 are then combined to generate a coarse 3D map.

Figure 4B:
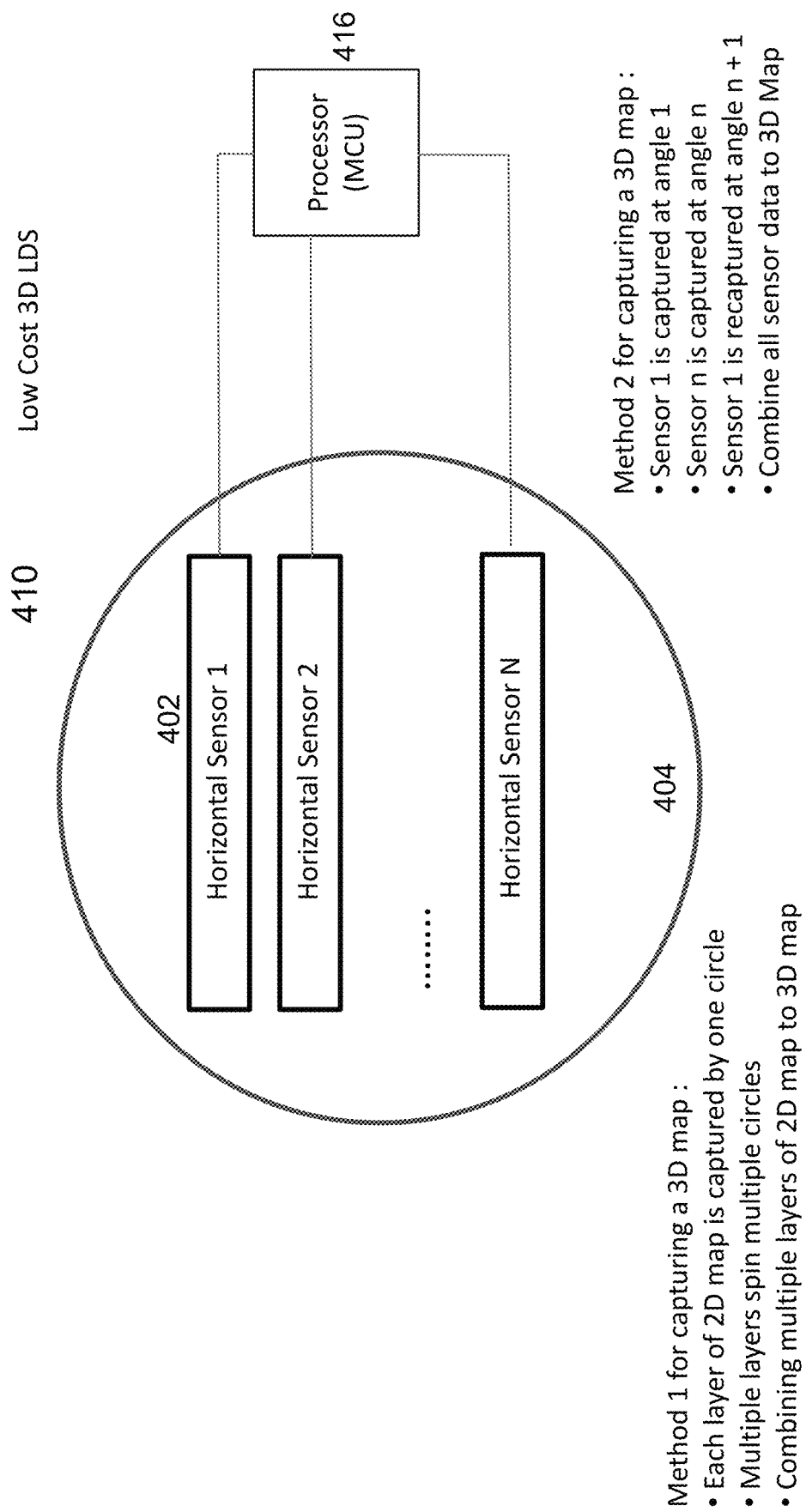
FIG. 4B shows another exemplary implementation of generating a (coarse) 3D profile or map of a target.
Figure 4C:
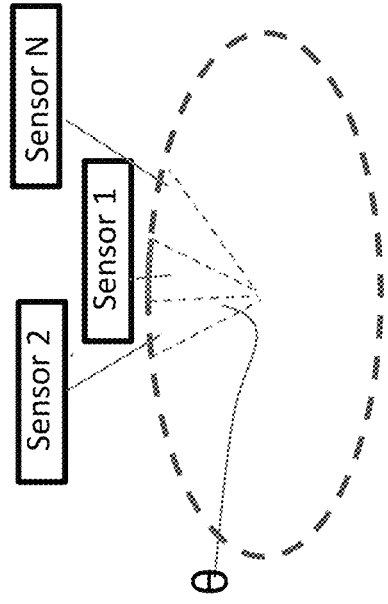
FIG. 4C illustrates a trace of a rotating sensing system including one embodiment of the present invention to show how each of the sensors is triggered to be operatively active per circular sensing.

FIG. 4B shows another exemplary implementation 410 of generating a 3D profile or map of a target 400. In view of FIG. 4A, the implementation 410 employs only one processor or MCU 416 to process the sensing signals from the sensors 402. Depending on implementation, each of the sensors 402 is engaged by the processor 416 for a circle or a predefined angle of a circle. According to one embodiment, when a sensing system employing the sensors 402 rotates, all the sensors 402 generates sensing signals, but at any time, there is only one sensor whose sensing signal is read out to the processor 416. The cycle for reading out the sensing signal is defined for a cycle the sensing system completes. FIG. 4C illustrates a trace cylinder 412 of a rotating sensing system (not shown). The trace cylinder 412 implies the areas the array of sensors would see when being rotated. For every circular movement, a designated sensor provides the sensing signal to be processed in the processor 416. It is assumed that the sensors shown in FIG. 4A or FIG. 4B are used. For example, sensor N would see the very top band of cylinder 412 when the sensing system starts to rotate. The sensing signal from sensor N is coupled to the processor 416 and processed therein. A next sensor N−1 starts as soon as sensor N finishes sensing the surrounding in a circle. Subsequent sensors continue respectively in the same fashion. Sensor N is operatively active again when sensor 1 is done.

Figure 4E:
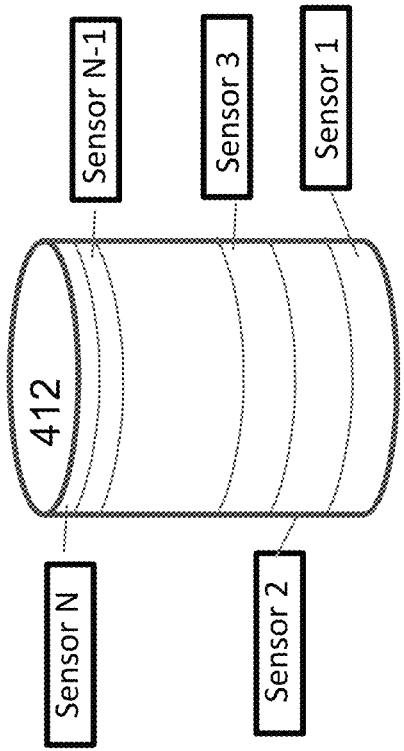
FIG. 4E shows another sensing method to show how each of the sensors views when a sensing system employing these sensors rotates in an exemplary environment.
Figure 4D:
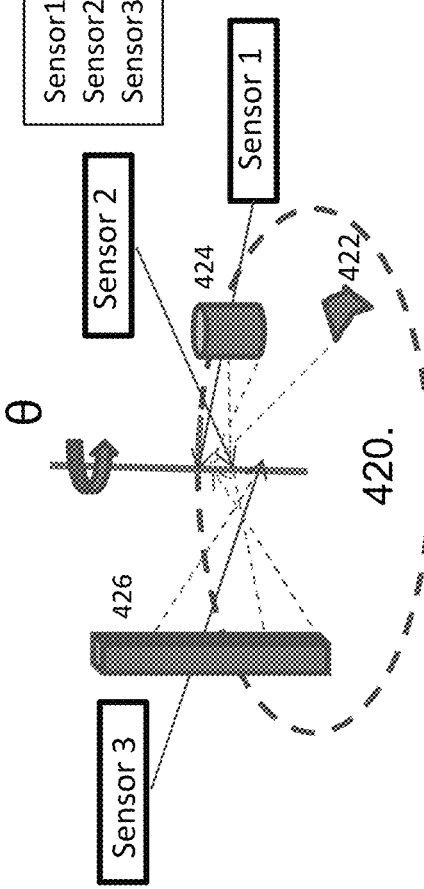
FIG. 4D shows an exemplary environment that is being sensed according to FIG. 4C.

FIG. 4D shows an exemplary environment 420 that is being sensed according to FIG. 4C. There are three objects 422, 424 and 426 in the environment 420. When a mobile robot is moving in the environment 420. The sensing system carried with the mobile robot is caused to rotate rapidly to sense the environment 420. It is assumed that there are three linear sensors (sensor 1, sensor 2 and sensor 3 corresponding to FIG. 3A) employed in the sensing system. As each of the three sensors 1, 2 and 3 takes turns to sense the environment, each sees a different view. In operation, when sensor 1 scans the environment in a circle, it sees all the objects 422, 424 and 426. When sensor 2 scans the environment in a circle, it sees two the objects 424 and 426. When sensor 3 scans the environment in a circle, it sees only object 426.

According to one embodiment, FIG. 4E shows another sensing method as mentioned above. Each of the sensors is equally operative for a portion of a circle. In other words, when the sensing system is rotated for a circular range, only one of the sensors is active, namely the sensing signal is coupled to the processor 416 for processing. For example, sensor 1 is active for a first portion of the circular sensing, sensor 2 is active for a second portion of the circular sensing and so on till sensor N is active before sensor 1 is active again. The circular range is generally small, for example 1 or 2 degrees, assuming an object in a scene is not too small, hence the circular range defines a scanning resolution. One advantage of this embodiment is to facilitate the processor 416 to multiplex the sensing signals from the sensors for processing.

FIG. 5A shows a functional block diagram 500 of a single pixel 502 in an image sensor that may correspond to one of the linear sensors 202 of FIG. 2A. When the image sensor (an array of such pixels) is exposed (e.g., via a shutter or circuit control) to a scene, a charge proportional to the incoming light intensity is accumulated in the pixel 502. A supporting circuit 504 is provided to read out the charge. FIG. 5B shows an exemplary design of a photosensor or pixel element 510 with an amplifier 512 and a readout circuit 514. The pixel element 510 further includes a photodiode or sensing element 516 that is controlled to be turned on or off.

The amplifier 512 is an amplifier provided to amplify the signal produced by the photodiode 516. As an example shown in FIG. 5B, the amplifier 512 is implemented with what is called unity gain buffer amplifier (UGBA). As the name suggests, the amplifier is one that provides electrical impedance transformation from one circuit to another, with the aim of preventing a signal source from being affected by whatever currents or voltages that the load may produce. The readout circuit 514 in FIG. 5B uses an exemplary readout circuit provided to read out the charge accumulated in proportional to the intensity of the light impinged on the diode 516. As an exemplary, the readout circuit 514 is implemented with correlated double sampling (CDS) circuitry to read out the sensing signal from the pixel 510. Another amplifier (not shown) may also be added as a charge integrator to produce a final sensing signal to be coupled for digitization.

The correlated double sampling, or CDS, circuitry is a method employed to improve the signal to noise ratio (S/N) of an image sensor by reading out the pixel 510 twice. The first readout happens right after the exposure of the sensor to a scene. The second readout happens without the sensor is exposed to the scene but soon after the first readout has successfully occurred. Accordingly, the first readout is herein referred to as actual light-induced signal while the second readout is referred to as a reference signal. The reference signal is largely coming from internal dark or reference output level in the pixel. By subtracting the reference output signal from the actual light-induced signal, static fixed pattern noise (FPN) and several types of temporal noise are effectively removed from the output of the sensor. In operation, the first readout of the signal from the photosensor 516 is stored on a capacitor 518 and the second readout the signal from the photosensor 516 is stored on a capacitor 520. The final readout of the signal is the difference between the signals on the capacitors 518 and 520.

Figure 6A:
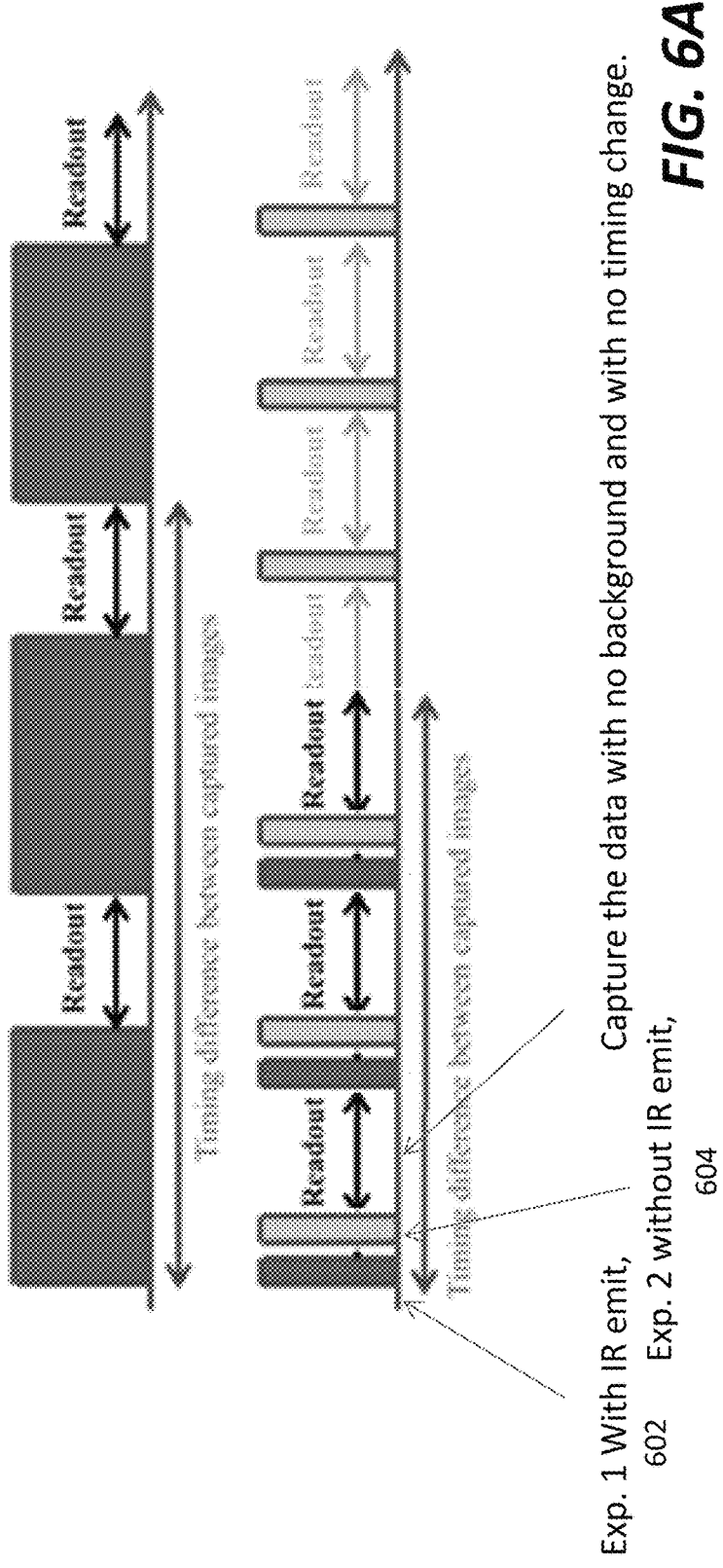
FIG. 6A shows an exemplary operation of reading out the signal from a photodiode, where the signal has the background removed without reducing the sensing cycle originally designed for the image sensor.

Referring now to FIG. 6A, it shows an exemplary operation of reading out a final sensing signal from a photosensor, where the sensing signal has the background removed without reducing the sensing cycle originally designed for an image sensor. Based on the principles of the CDS, according to one embodiment, after the exposure 602 to a scene with an IR light is impinged upon an object, another exposure 604 follows immediately without having the light emitted. The signal from the first exposure is stored on the capacitor 418 of FIG. 4B and the signal from the second exposure is stored on the capacitor 420. The final readout of the signal is the difference between the signals on the capacitors 418 and 420. It can be noticed, compared to the prior art solution, that there is no need to wait for the first exposure to finish (read out) before the second exposure takes place. As a result, a clean image without the background light interference is obtained within one frame of time.

Figure 6B:
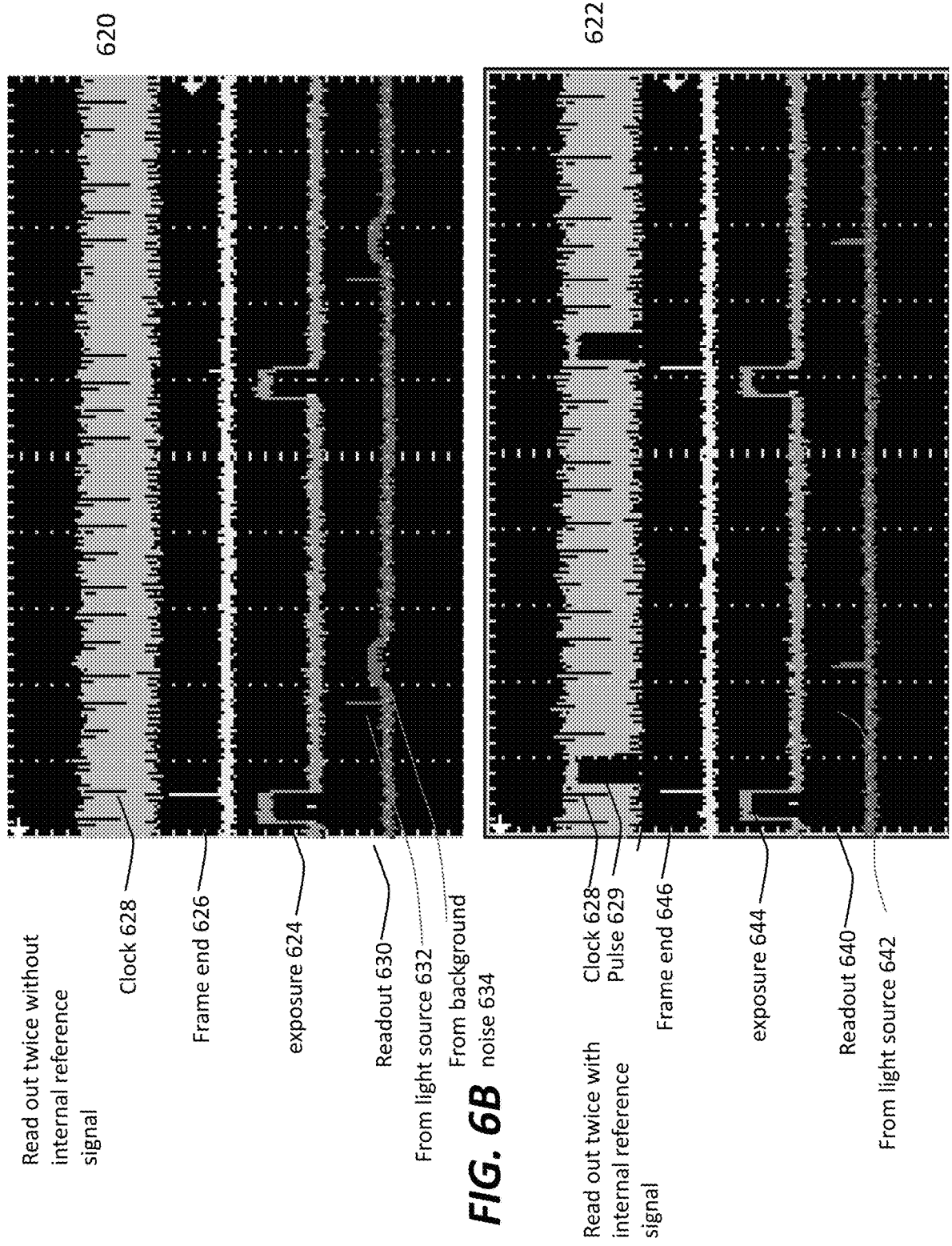
FIG. 6B shows two sets of signals according to one embodiment of the present invention.

FIG. 6B shows two sets of signals 620 and 622 according to one embodiment of the present invention. As an example and a comparison, the signals set 620 are used to read out the signal from a sensor according to the CDS. The curve 624 shows that an exposure is activated. A pulse 626 is provided to signal the end of the exposure and cause a clock signal 628 to start the second readout according to the CDS. In other words, the second readout is based on the internal reference signal from the sensor without having the sensor exposed to the scene. The resulting readout from the sensor is shown as 630 and includes signals 632 pertaining to the background lights besides the signal 634 of the reflected light dot from the emitted light (e.g., visible or invisible laser or infrared) from a light source disposed next to the sensor in a predefined configuration.

The signals set 622 shows the clock signal 628 is modified or redesigned by including a pulse 629 (e.g., the width of pulse may be adjusted to substantially that of the exposure pulse 644) to disable the second readout from the photodiode. Instead, the pulse 629 causes the sensor to be immediately exposed to the scene with the light source turned off. The resultant readout from the sensor is shown as 640 and includes the signal 642 of the reflected light dot from the emitted light (e.g., visible or invisible laser or infrared) from a light source disposed next to the sensor in a predefined configuration.

Figure 7:
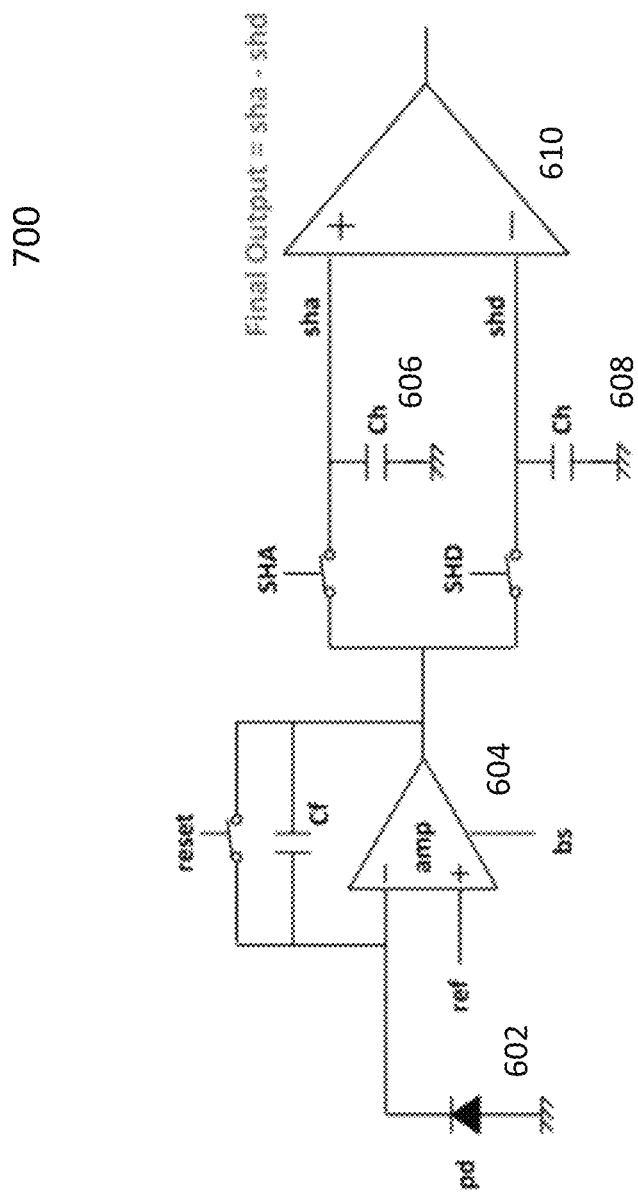
FIG. 7 shows an exemplary circuit according to one embodiment of the present invention.

Referring now to FIG. 7, it shows an exemplary circuit 700 that may be used to implement one embodiment of the present invention with the reference to the clock signals in the signals set 522 of FIG. 5B. The circuit 700 represents one photodiode or photosensor in an image sensor that may be a CMOS-based linear or area sensor. A photodiode 702 is turned on (to be exposed to a scene) and off. Upon a clock signal, the photodiode 702 is turned on for a period in an image frame (e.g., 1/30 second), a first signal is generated by the photodiode 702, where the first signal or intensity thereof is proportional to an intensity of an incoming light impinged upon the photodiode 702. The first signal is then amplified in an amplifier 704. A first readout takes place by charging a storage device (e.g., a capacitor 706) with the amplified signal from the amplifier 704. Immediately right after the first signal is read out onto the capacitor 706 (controlled via a switch SHA by a clock signal), the photodiode 702 is turned on again for a period within the same image frame. A second signal is generated by the photodiode 702, where the second signal or intensity thereof is proportional to an intensity of an incoming light impinged upon the photodiode 702. Similar to the first signal, the second signal is then amplified in the amplifier 704. A second readout (controlled via a switch SHD by a clock signal) takes place by charging another storage device (e.g., a capacitor 708) with the amplified signal from the amplifier 704. The final output (signal) is the subtraction between the two charges on the two different capacitors 706 and 708.

In operation, there are essentially two successive exposures with the photodiode 702. In one embodiment, the first exposure is a scene with a light source turned off. The charge on the capacitor 706 pertains to a background. If there are ambient lights in the background, the charge on the capacitor 706 would capture the ambient lights. The second exposure is a scene with a light source turned on. In other words, an object is being illuminated by a projected light from a light source with a known configuration with respect to the image sensor (e.g., the photodiode 702). The charge on the capacitor 708 pertains to the background as well as the reflection of the light on the object. An adder 710 is provided to perform the subtraction between the two charges on the two different capacitors 706 and 708, namely subtracting the background from the second charge. As a result, the final signal presents a clean reflection of the projected light.

According to one embodiment, the present invention may be realized by a clock signal circuit to control an existing CMOS image sensor, where the clock signal circuit generates one or more signals, at least one of the signals is used to modify the clock signal 528. The modified signal is shown correspondingly in the signal set 522. One of the advantages, benefits and objectives in this implementation is to take advantages of the existing CMOS sensors to realize one embodiment of the present invention.

Figure 8:
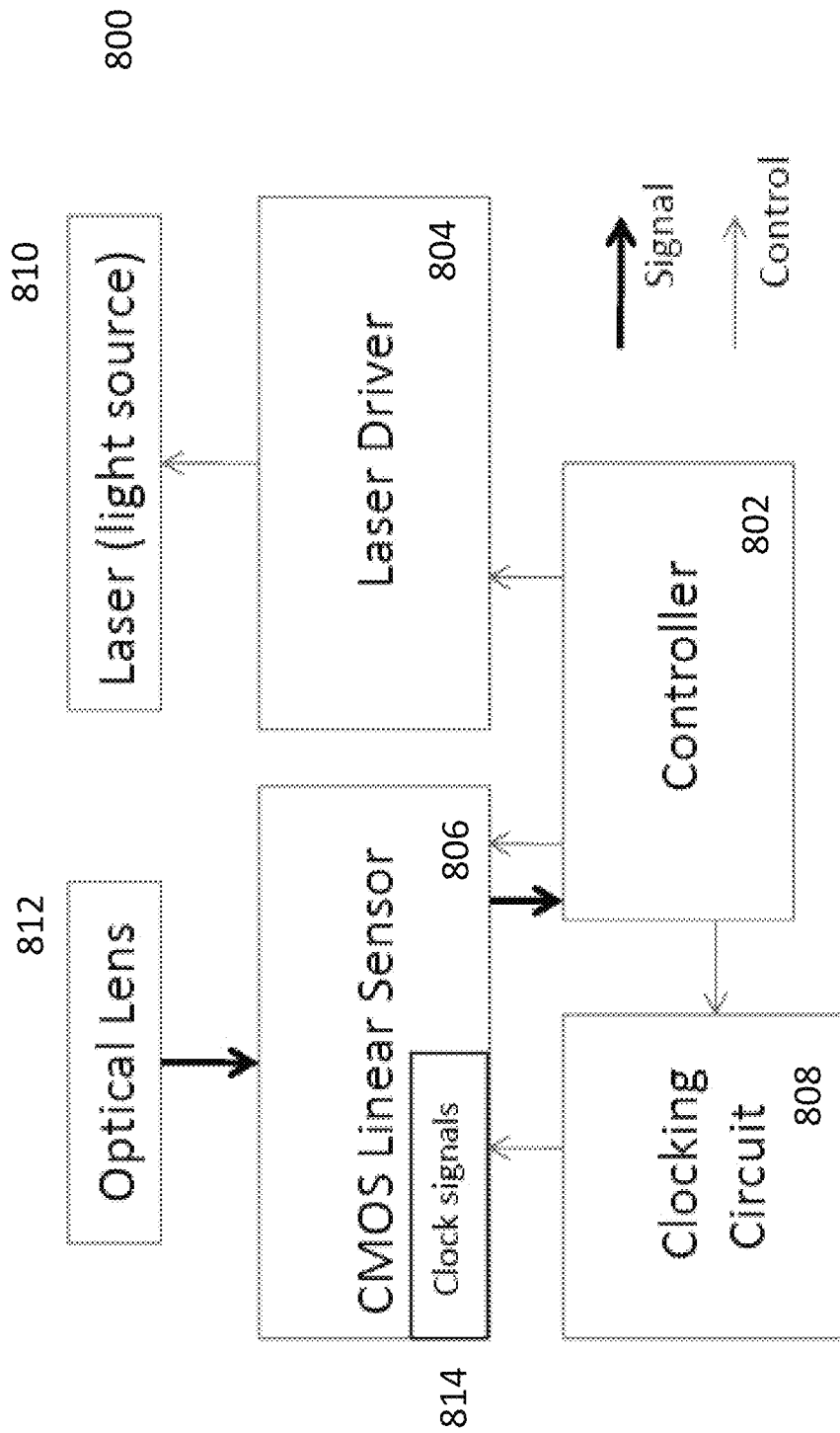
FIG. 8 shows an exemplary system block diagram in which the present invention can be used according to one embodiment of the present invention.

FIG. 8 shows an exemplary system block diagram 800 in which one embodiment of the present invention may be implemented. A controller 802 is provided to synchronize the operations of a laser driver 804, a sensor 806 and a clocking circuit 808. In operation, the controller 802 controls when a light source 810 is turned on or off as well as when a scene is captured by the sensor 806 via a lens. One of the important features, benefits and advantages of the present invention is the use of the clocking circuit 808 to control the clock signals 814. Depending on the implementation, the clock signals 814 may be provided or generated internally or externally for the sensor 806 to operate normally. In the prior art, one of the clock signals 814 (e.g., the clock signal 628 in the signals set 622) is used to generate the internal dark or reference output level. In the embodiment, the clocking circuit 808 generates one or more clock signals to control/modify the clock signals 814. In particular, as shown in FIG. 6B, the clock signal 628 (i.e., one of the clock signals 814) is modified via an output from the clocking circuit 808 to the corresponding clock signal in the signals set 522. In another perspective of the clock signal 528, assuming that a first pulse is used to trigger an exposure and a second pulse is used to generate the internal dark or reference output level, one or more of the clock signals 814 is used to suppress or stop the second pulse and instead cause a second exposure. As a result, there are two charges available in the pixel before a final signal is read out. With this embodiment, the background light interference can be effectively removed without significant changes to the sensor 806.

According to another embodiment, a circuit for generating the clock signals 814 may be simply modified to generate the corresponding clock signal in the signals set 622 to effectively control the operation of the sensor 806, resulting in two successive exposures to cancel the background light interference, wherein charges from the two successive exposures are retained within a pixel before a final readout is obtained from the pixel.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

I claim:

1. A sensing system for coarse 3D mapping, the sensing system comprising:
   a substrate;
   a plurality of linear sensors spaced apart in parallel and deposed on the substrate, each of the linear sensors including a plurality of sense elements;
   a light source projecting a light bar, wherein the light bar hits a target to produce a plurality of reflected beams, where the reflected beams impinges the linear sensors to generate a plurality of 2D maps, each of the linear sensors includes:
      a linear array of pixels, each of the pixels including one photosensor and producing a final signal within a predefined frame, the final signal captures a reflected light without background light interference;
      a readout circuit including at least a first storage device and a second storage device; and
      a clock circuit, coupled to the each of the sensors and the readout circuit, causing the readout circuit to store a first charge and a second charge on the first storage device and the second storage, respectively, the first charge or the second charge is proportional to an intensity of an incoming light impinged upon the photosensor, the first charge and the second charge are created successively within the predefined frame, and the final signal is a subtraction between the first charge and the second charge; and
   a computation unit to generate a coarse 3D map from these 2D maps.

2. The sensing system as recited in claim 1, wherein the sensing system is rotated rapidly to sense a band in an environment, where a height of the band changes as a distance towards the target varies.

3. The sensing system as recited in claim 2, wherein the computation unit limits the coarse 3D map only to the height.

4. The sensing system as recited in claim 3, wherein the height is a clearance for a mobile robot employing the sensing system.

5. The sensing system as recited in claim 3, wherein only one of the linear sensors is operatively active.

6. The sensing system as recited in claim 5, wherein the linear sensors are coupled to a processor, only one of sensing signals from the sensors is processed in the processor at a time.

7. The sensing system as recited in claim 5, wherein each of the linear sensors is successively to operate when the sensing system rotates a complete circle or a predefined circular range.

8. The sensing system as recited in claim 1, wherein each of the linear sensors is CMOS based with correlated double sampling (CDS) to avoid a sensing speed being halved.

9. The sensing system as recited in claim 1, wherein the reflected light is produced by reflection from an object impinged upon by an emitted light from a light source, wherein the light source and the each of the linear sensors are disposed in a known configuration.

10. The sensing system as recited in claim 9, wherein the target is positioned in a background with other ambient lights, and the first charge pertains to the incoming light with the light source turned on, and the second charge pertains to the incoming light with the light source turned off.

11. The sensing system as recited in claim 10, wherein the readout circuit includes at least a switch to control which one of the first and second storage devices is used to store the first charge or the second charge, none of the first and second charges is from an internal dark or reference output level in the photosensor.

12. The sensing system as recited in claim 11, wherein the second charge is generated while the first charge remains in the first storage device.

13. The sensing system as recited in claim 12, wherein the readout circuit is activated to produce the final signal from the first and second charges in the first and second storage devices.

14. The sensing system as recited in claim 13, wherein either one of the first and second storage devices is a capacitor.

15. A method for a sensing system to generate a coarse 3D map, the method comprising:
   projecting a light bar forward from a light source, wherein the light bar hits a target to produce a plurality of reflected beams, where the reflected beams impinge upon a plurality of linear sensors;
   generating a plurality of 2D maps respectively produced via the linear sensors spaced apart in parallel and desposed on the substrate, each of the linear sensors including:
      a linear array of pixels, each of the pixels including one photosensor and producing a final signal within a predefined frame, the final signal captures a reflected light without background light interference;
      a readout circuit including at least a first storage device and a second storage device;
      a clock circuit, coupled to the each of the sensors and the readout circuit, causing the readout circuit to store a first charge and a second charge on the first storage device and the second storage, respectively, the first charge or the second charge is proportional to an intensity of an incoming light impinged upon the photosensor, the first charge and the second charge are created successively within the predefined frame, and the final signal is a subtraction between the first charge and the second charge; and
   generating a coarse 3D map of the target from these 2D maps.

16. The method as recited in claim 15, wherein the sensing system is rotated rapidly to sense a band in an environment, where a height of the band changes as a distance towards the target varies.

17. The method as recited in claim 16, wherein the coarse 3D map is limited to the height.

18. The method as recited in claim 17, wherein the height is a clearance for a mobile robot employing the sensing system.

19. The method as recited in claim 15, wherein all of the linear sensors are operative simultaneously or only one of the linear sensors is operative at a time.

* * * * *